United States Patent [19]

Cassagne et al.

[11] Patent Number: 4,752,827
[45] Date of Patent: Jun. 21, 1988

[54] METHOD AND DEVICE FOR THE NUMERICAL CODING OF AN IMAGE, MORE PARTICULARLY A TELEVISION IMAGE

[75] Inventors: Pierre Cassagne, Toulouse; Gabriel Lowitz, Tolosan, both of France

[73] Assignee: Matra, Societe Anonyme, Paris, France

[21] Appl. No.: 643,971

[22] PCT Filed: Jan. 6, 1984

[86] PCT No.: PCT/FR84/00006
§ 371 Date: Aug. 15, 1984
§ 102(e) Date: Aug. 15, 1984

[87] PCT Pub. No.: WO84/02821
PCT Pub. Date: Jul. 19, 1984

[30] Foreign Application Priority Data

Jan. 6, 1983 [FR] France ................ 83 00144

[51] Int. Cl.$^4$ ............................................. H04N 7/04
[52] U.S. Cl. ............................ 358/141; 358/133; 358/13
[58] Field of Search .............. 358/133, 136, 12, 13, 358/21 R, 141; 382/56

[56] References Cited

U.S. PATENT DOCUMENTS

| | | | |
|---|---|---|---|
| 4,210,927 | 7/1980 | Yumde et al. | 358/133 |
| 4,281,312 | 7/1981 | Knudson | 382/56 |
| 4,302,775 | 11/1981 | Widergren et al. | 358/136 |
| 4,558,350 | 12/1985 | Murakami | 358/12 |

FOREIGN PATENT DOCUMENTS 2079567  1/1982  United Kingdom .

OTHER PUBLICATIONS

G. E. Lowitz, "Compression des données images par reconnaissance des Formes et Clustering", Reconnaissance des formes et traitement des images, Congrés AFCET-IRIA, Feb. 21-23, 1978, pp. 699–714.

F. J. In der Smitten, "Informations reduzierende Quellencodierung von Farbbildsignalen", Nachrichtentechnische Zeitschrift, No. 5, May 1974, pp. 176–181.

Primary Examiner—James J. Groody
Assistant Examiner—David E. Harvey
Attorney, Agent, or Firm—Larson and Taylor

[57] ABSTRACT

A method and device for the numerical coding of an image, more particularly a television image, made up of pixels (elementary points) which are regularly distributed in the plane of the image, and to which one or more radiometric qualities denoted as components $C_i$ are allotted. In the image, windows (f) are determined which have a predetermined geometrical shape and comprise a certain number of pixels (p); for each window regroupings are carried out into classes (R1,R2 . . . ) of radiometries (spectral or spatial) of the ends of the vectors representing the pixels or combinations of pixels of the image in space of N dimensions, in accordance with a criterion of proximity; for each class (R1,R2 . . . ) from the individual values of the pixels forming the class, N typical radiometries are defined which will be stored or transmitted to be used in the reconstruction of the image; to define each pixel, a characteristic code of the class (R1,R2 . . . ) to which it belongs will also be stored or transmitted enabling the pixel to be given the corresponding typical radiometries for the reconstruction of the image.

19 Claims, 7 Drawing Sheets

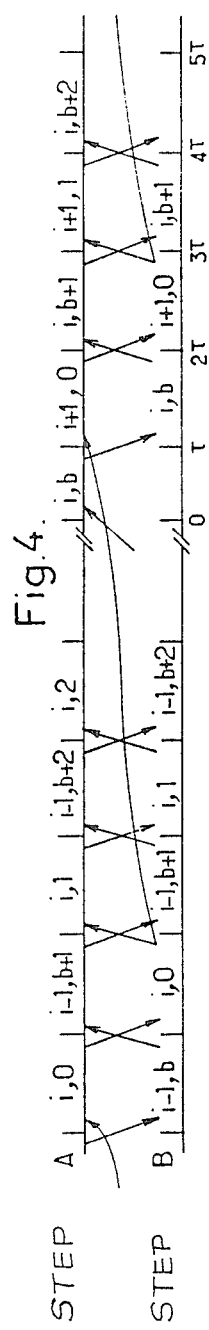
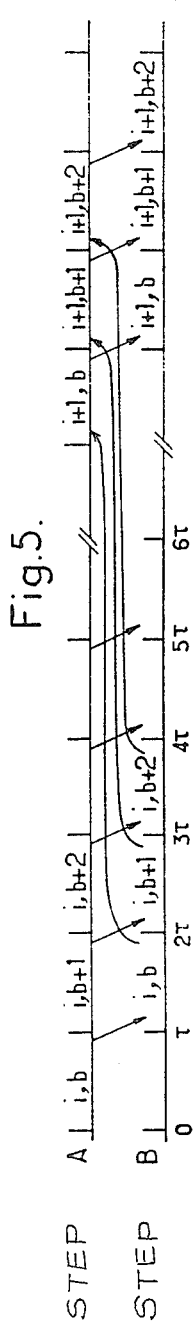
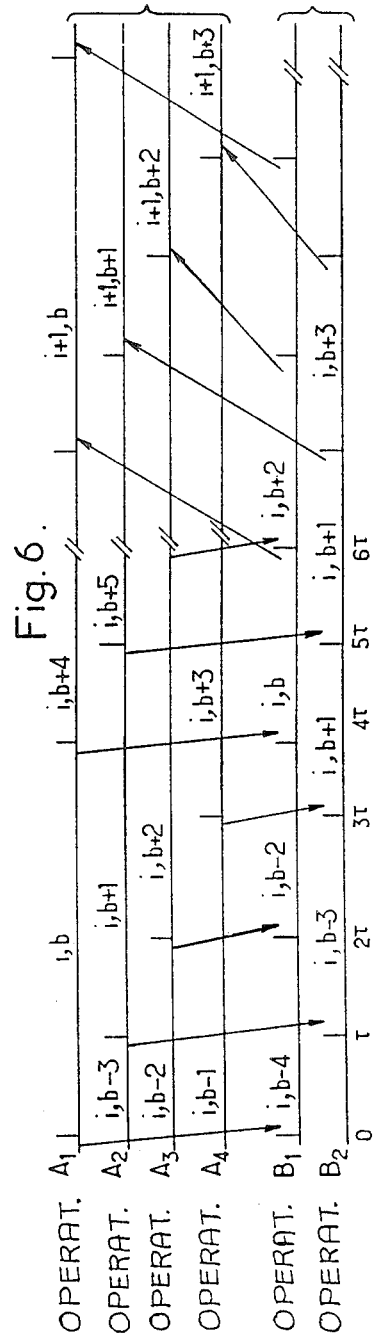
Fig. 4.
Fig. 5.
Fig. 6.

METHOD AND DEVICE FOR THE NUMERICAL CODING OF AN IMAGE, MORE PARTICULARLY A TELEVISION IMAGE

The invention relates to a method or a device for the numerical coding of an image, more particularly a television image, made up by elementary points (pels or pixels) which are regularly distributed in the plane of the image and to which are allotted one or more radiometric qualities denoted as components $C_i$.

The components $C_i$ can be, for example, the measurements of the radiometries of each pixel in N spectral channels supplied by suitable pickups staged over the spectrum of radio-electric frequencies; visible, infrared, X radiation, etc ... They can also be quantities deduced from the measured radiometries, in a single spectrum zone of a predetermined spatial arrangement of pixels, by a linear transformation defining N independent channels.

The digitalization of an image for its processing or transmission causes a very large volume of information to appear which is always difficult to handle if acceptable fidelity is to be maintained.

In the example of colour television, it is considered that the density and precision of sampling for the practically distortion-free reproduction of a colour image requires about 6 million bits, at the rate of 16 bits per pixel. The numerical output of a television transmission on this basis implies a channel of 170M bits/second—i.e. the equivalent of 2,500 telephone calls. This is a ratio which is prohibitive in view of current cost levels and which would heavily penalise the economics of such a transmission system.

Attempts have therefore been made to evaluate numerical processing methods adapted to reduce such output and, for this purpose, to eliminate as far as possible the redundancy of the message. In practice this means avoiding the repetition of information already transmitted as long as the variations observed, in space or in the time between adjacent samples, are lower than certain values defined in relation to the required quality (signal-to-noise ratio, undesirable structures and fluctuations, sensitivity to errors, etc.)

Numerous proposals, using differential coding techniques, orthogonal transformations, statistical coding methods and a combination thereof have been tried out with differing degress of success, although none of them has been found completely satisfactory. It has also been proposed (G LOWITZ "Recognition of shapes and processing of images", AFCET-IRIA Congress, Feb. 21-23, 1978, pages 699-714) to adopt a method using a technique frequently known by the Anglo-Saxon term "clustering". In that method for the numeral coding of an image, more particularly a television image, windows are determined in the image which have a predetermined geometrical shape and comprise a certain number of elementary points; for each window regroupings are performed into classes of radiometries (spectral or spatial) of the ends of the vectors which represent the pixels or combinations of pixels of the image in space or N dimensions in accordance with a criterion of proximity; one defines for each class, from the individual values of the pixels forming the class, N typical radiometries which will be stored or transmitted to be used in the reconstruction of the image; to define each pixel a characteristic code of the class to which it belongs is also stored or transmitted enabling it to be given the typical corresponding radiometries for the reconstruction of the image.

It is a primary object of the invention to provide a method and device for numerical coding of images which are free from or at least less subject to the aforementioned disadvantages and which more particularly enable a high compression rate to be obtained.

To this end the invention proposes a method characterised in that a processing of high spatial frequencies is performed by a unit transformation one of whose coefficients, that of the new value corresponding to lower spatial frequencies, is associated with the components of different spectral channels for processing by a complementary classification.

The idea of proximity, the measurement of which is used as the criterion for regrouping the pixels into classes, must be understood in a very wide sense to be defined in accordance with an application of the method, as will be seen hereinafter. The metrics associated with it must in fact take into account each quality criterion essential for the satisfactory reconstruction of the image; these may differ substantially in dependance on the end sought (for example, fidelity of contours, rendering of half-tints, strong differentiation of textures or colours, etc.) in the application envisages.

The criterion of proximity can be, for example, the distance, in conventional metrics, in space of N dimensions between the end of the vector representing a pixel and the end of a vector representing a class; in that case for each window a number of classes can be established which are identified by a vector whose N components correspond to predetermined values of the radiometries for each channel of the image; for each pixel the distance in space of N dimensions is calculated between the end of the vector representing such pixel and the end of each vector representing a class; the distances thus obtained are compared for each pixel, and the pixel is included in the class corresponding to the shortest distance obtained; for each pixel on the one hand a code is stored or transmitted enabling the class to be identified in which the pixel has been included, while on the other hand a dictionary is stored or transmitted which gives for each class the components of the vectors representing that class and obtained by calculation from the different pixels belonging thereto.

The method is based on the characteristics of the natural images which indicate the possibility of grouping the pixels (elementary points) of an arbitrarily bounded subimage (or window) into a restricted number of judiciously selected classes. As a result each pixel can be qualified by a code with a small number of bits whose meaning is given by the specific conversion table (dictionary) of the subimage processed.

In the histogram of the radiometries of the window (or subimage), groups of points included in a predetermined class must be discovered whose initial radiometric values can be validly replaced by a group of radiometric values corresponding to that of the class.

Instead of transmitting or storing for each pixel or combination or pixels the radiometric values discovered, they are given a code (the number of the class in which they were included), whose number is much lower than the assembly of possible radiometries. To make the message intelligible it is enough to add to each window (assembly of classes) a dictionary in which each class code is explained by its corresponding radiometries.

To make considerable compression possible, subimages (windows) of sufficient volume must be processed to enable the transmission of the dictionary of the conversion table to be considered as marginal in the global volume of the message.

Preferably, for a particular window, after a first classification of the elementary points in the predetermined classes has been carried out, and radiometries typical of the points have been calculated for each class from the points which were included in such class, a fresh classification of each elementary point is performed into fresh classes based on the calculated radiometries, such iteration operation being repeated as many times as necessary to obtain a predetermined precision.

By an adaptive method, therefore, an attempt is made to obtain the best radiometry representative of each group of pixels included in a class, so as to introduce only a negligible error into the energy balance of the transformation.

Clearly, the efficiency of such a clarification is intimately bound up with the statistical properties of the image, in both spectral and spatial energy distribution. To use such statistics to the best advantage, the method should be applied to homogeneous data—i.e. data characterising one or other of these aspects independently. For example, we can deal with the various $C_i$ components of the same pixel in different spectral channels and form the classes in accordance with a criterion of spectral similarity. In monochrome we can also define the N channels referring to a spatial distribution of the pixels or combination of pixels in a group of suitable shape. The fact is that this method may prove less effective if the two types of data, spectrum and spatial, are classified simultaneously, thus bringing into play two different categories of statistics.

This problem is solved by the processing of generally panchromatic spatial high frequencies by a unit transformation, one of whose coefficients, that of the mean value corresponding to lower spatial frequencies, is associated with the components of different spectral channels for processing by a complementary classification such as that described hereinbefore.

In practice, in colour television, in order to make the best use of the image, procedure is as follows: a number of elementary points are combined and for each combination a new value of the luminance and chrominance components $[(Y_M) (R-Y)_M (B-Y)_M]$ is determined from each component from each elementary point of the combination; the previously mentioned classification operations are performed; and, for the reconstruction of all the elementary points on reception, a linear transformation is applied to the luminance signals (Y) of each of the elementary points of a combination which enables the volume of information to be transmitted to be reduced, and the values of the complementary coefficients resulting from such transformation are transmitted and, on reception, an expansion of information is performed by deducting, from the mean values transmitted $[(Y_M) (R-Y)_M (B-Y)_M]$ and the transformed values also transmitted, the luminance and chrominance values for each elementary point of a group.

The combination of the points may concern four or sixteen adjacent pixels, which are grouped in accordance with the type of probing, orthogonal, quincunx or raster which may have been selected.

Two complementary conjoint zones are therefore defined by selecting for each of them the mode of coding best adapted to their nature.

The first zone forms a polychromatic subassembly, each point of which corresponds to the mean point of a combination and comprises components obtained with a lower probing density.

The second zone required for a reconstruction with full resolution is formed from the high frequencies of the luminance signal (Y) on its own, without any chromaticity information.

Advantageously, the unit transformation used is a Walsh Hadamard transformation.

The window is advantageously formed by at least one horizontal line; in the case of the television image, the window is advantageously formed by two contiguous lines. Advantageously, there are thirty two classes.

The invention also relates to a device for putting the method defined hereinbefore into effect; such a device is characterised in that it comprises:

means for forming a window in the colour image and for sweeping the whole image by such window;

means for acquiring the values associated with each elementary point of a window;

means for calculating the distances between the end of the vector corresponding to an elementary point or a mean point of the combination of a number of elementary points and the ends of the vectors identifying each class;

comparator means enabling each elementary point or each mean point to be included in the class corresponding to the shortest distance calculated;

and means for calculating the components of the vector identifying a class from the different points belonging thereto, the output of such device being connected to the means for transmitting the output data.

Apart from the arrangements set forth hereinbefore, the invention consists in certain other arrangements which will be described more specifically hereinafter in connection with the special embodiments described in detail with reference to the accompanying drawings.

BRIEF DESCRIPTION OF THE DRAWINGS

FIGS. 4 to 6 are diagrams of the processing of successive images;

DETAILED DESCRIPTION OF EMBODIMENTS

In the following description, mainly with reference to colour television images, based on an analysis of the trichromatic image into the three primaries "red, green and blue" supplying three independent channels will for reasons of simplification be presented as a combination of such primaries R, V, B, to give the luminance (Y).

In this example the number of channels N is therefore equal to three.

However, the method and device according to the invention are also suitable for treating images with a number of images higher or lower than three.

Figure 1:
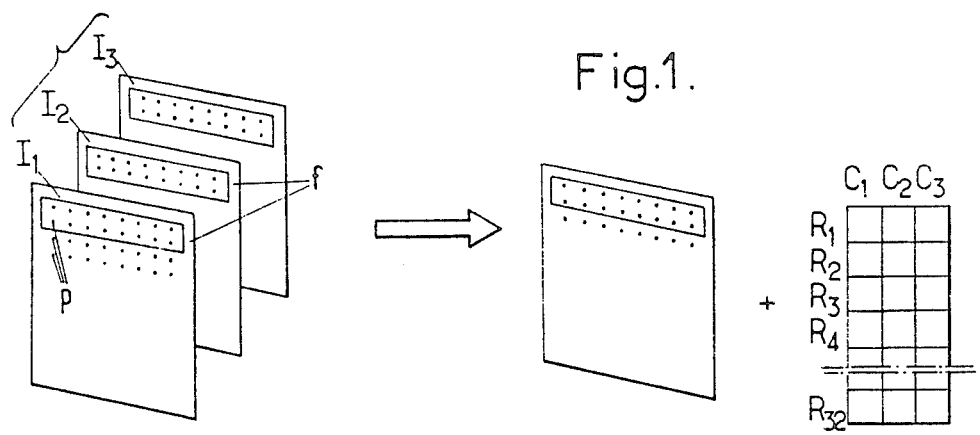
FIG. 1 is a diagram illustrating the method according to the invention.

The colour television image can be considered as a combination of three primary images I1, I2, I3, shown diagrammatically on the left hand side of FIG. 1 and corresponding to the three channels. Each image is made up of pixels p distributed in lines; the pixels of image I1 are associated with the radiometry values for the first channel, those of the image I2 being associated with the radiometry values for the second channel, and those of the image I3 being associated with the radiometry values for the third channel.

COMPRESSION BY CLASSIFICATION

In the image windows f are made which have a predetermined geometrical shape and comprise a certain number n of pixels p. For each window f a number of classes R1, R2 ... are established which are represented on the right hand side of FIG. 1 by rows. Each class is identified by a vector of a space of three dimensions (N=3) whose components correspond to predetermined values of the radiometries C1, C2, C3 for each channel of the image.

For each pixel of the window f, the distance D is calculated in the tridimensional space between the end of the vector which represents such a pixel and whose components are formed by the radiometries associated with such pixel in the three channels in question and the end of each vector identifying a class.

The fact is that the calculation must be carried out taking into account the nature of the application, in this case colour television, in which the quality of the image reproduced is judged by a human observer whose eye has very special characteristics as regards the "subjective fideltiy" of the reproduction. More particularly, in the space with three dimensions, $R-Y$, $B-Y$, different non-linear metrics can be used which are adapted to the differential sensitivity of the human eye in accordance with each of those axes. For example, the Weber Fechner law states this differential sensitivity in accordance with the axis of the luminances for which a logarithmic scale will be better adapted than a linear scale, and will enable more satisfactory subjective distances to be calculated. Such conversions can therefore be carried out on the radiometries of each of the channels using tables, if no simple mathematical law of transformation is available, before calculating the Euclidian distance in the transformed space.

For example, for class R1, if we denote the components of the vector identifying such class by C11, C21, C31 and the radiometries of the i-th pixel by $\gamma 1i$, $\gamma 2i$, $\gamma 3i$, the distance between the vector representing such i-th pixel and the vector identifying class R1 will be defined by: $(D1i)^2 = (C11-\gamma 1i)^2 + (C21-\gamma 2i)^2 + (C31-\gamma 3i)^2$.

For the i-th pixel the distances relative to all the class, advantageously 32 are calculated. In this way 32 calculated distances D1i ... D32i will therefore be obtained.

Then the 32 distances are compared so as to determined the shortest distance, and i-th pixel is included in the class corresponding to such shorter distance, for example, class R4.

Then, for the i-th pixel only one code will be transmitted which enables the class R4 in which it has been included to be identified.

The code requires only a reduced number of bits in comparison with what would have been necessary to transmit the three radiometries corresponding to such i-th pixel.

A dictionary is also transmitted which gives, for each class R1 ... R32 the components C'1, C'2, C'3 of the vector identifying such class. The transmitter components C'1, C'2, C'3 are obtained by calculation, more particularly the calculation of the barycentre, from the various points belonging to the class.

The method therefore provides, corresponding to the three windows f (corresponding to each primary radiometry) of each n pixels, a single chart of n codes associated with the dictionary in which each code is explained by the three components (N components in a more general way) of the vector identifying the class corresponding to the code. Preferably such components correspond to those of the barycentre of the points included in that particular class. However, such components might be determined by some other method of calculation (different from the barycentre), from the points included in the class.

The diagram in FIG. 1 summarises these operations.

Classification, i.e. the inclusion of the pixels in predetermined classes, uses a procedure in which pixels, the assembly of whose red, green and blue components are close to one another and may be confused, are regrouped into a limited number of "classes".

The classes are not defined arbitarily, but adapted to the tridimensional histogram of the radiometries of a window f (or subimage) cut out in the original image. If the number of pixels of the window f is not too high and the number of classes is not too low, by allotting to each pixel the mean value of the radiometries of the class in which it is included, a subimage very close to the original can be reconstituted.

By thus proceeding step by step, by the regular displacement of the window f to scan (sweep) the whole image, the message can be transmitted with very low degradation of information.

This method enables the binary volume of the message to be appreciably reduced in comparison with that resulting from the numerization of the three red, green and blue components.

Supposing that windows f are made each comprising 1024 pixels, each characterized by three radiometries coded with eight bits, the intial volume is:

$3 \times 8 \times 1024 = 24$ Kbits.

With the method according to the invention these pixels are classified in 32 different radiometric classes R1 ... R32, and each pixel is denoted by the code (number) of the class in which it is included; Five bits are enough to code the thirty-two classes in question. A first message of $5 \times 1024$ bits will therefore be delivered.

The first message is completed by the dictionary, giving the radiometric meaning of each of the codes; for each code, three radiometries each measured by eight bits must be transmitted, i.e.;

$32 \times 3 \times 8 = 768$ supplementary bits.

Finally, with the method just described, the transmission will be:

$(5 \times 1024) + 768 = 5888$ bits.

In comparison with the transmission of the initial message, the method gives a compression rate of:

(24×1024)/5888=4.17 approximately.

This high enough value justified coding on emission and decoding on reception.

The number of classes is an important factor in the precision of classification and therefore the ability to approximate most effectively the radiometric values of the original. However, too high a number of classes reduces the compression rate because of the number of bits of the code required to number each of the classes. It may be advantageous to have a variable number of classes available adapted to the histogram of the radiometries of the window with, as a counterbalance, the disadvantage of a code with a variable number of bits in accordance with the windows f, although this implies a method of transmission with undesirable output regulation.

Generally a fixed number of classes corresponding to a power of 2 will be taken; in the example under consideration, a selection was made of $32=2^5$ to fix the length of the code at five bits. This value was found to be acceptable for a large number of images of very different natures. However, it is a function of a second parameter—i.e. the number of pixels forming the processing window f; although the number is not critical, it influences the quality of reproduction if the number of classes is limited. Clearly, the variance of a class generally increases with the number of pixels belonging to it, and this leads to a more and more undesirable classification. However, there must be enough pixels to allow satisfactory adaptation to the statistics of the image. It has been found by experimentation that windows f of a few hundred pixels represent a satisfactory compromise.

The shape of the window cut out in the image can vary, as long as it covers contiguous zones in which spatial redundance is maximum. For television images, whose spatial distribution is converted into serial distribution in time, the windows are advantageously formed from the image scanning lines; this is why in the example previously quoted it was stated that the window f was formed by two continguous lines. In that case the assembly of pixels of one or more lines can be treated successively in a recurrent, continuous format, thus facilitating the performance of the method.

The number of pixels of the window can thus vary between 300 and 1500, in dependence on the required profineness of probing, within the limits suitable for satisfactory statistics of the radiometries.

For a particular window f, after a first classification of n pixels into the 32 classes R1 . . . R32, the barycentre of the pixels is calculated, for each class R1 . . . , from the pixels which were included in that class. A fresh classification of each pixel of the window can be performed into the 32 fresh classes based on the barycentres thus calculated. This iteration operation is repeated as many times as necessary to obtain a particular precision.

For example, if q is the number of pixels included in the class R4 which, during the first sweep was identified by a vector whose components were C14, C24, C34, the calculation of the barycentre after the first sweep will lead to the identification of class R4 by a new vector whose components will be:

$$C'14 = \frac{\sum_{i=1}^{i=q} \gamma 1i}{q}$$

$$C'24 = \frac{\sum_{i=1}^{i=q} \gamma 2i}{q}$$

$$C'34 = \frac{\sum_{i=1}^{i=q} \gamma 3i}{q}$$

The values $\gamma 1i, \gamma 2i, \gamma 3i$ correspond to the three components of each of the q pixels contained in class R4.

A phase of adaptivity is thus initiated by recalculating the barycentres of each of the classes, which will be used in the following iteration sweep, with a view to improving the classification of the pixels of the window in relation to the new barycentres. We can make the result more precise by successive iterations converging rapidly.

When the classification of the pixels of the window is completed, the codes are transmitted pixel by pixel, in the order predetermined by seeping and then the dictionary relating to such codes is transmitted; in one variant, the dictionary relating to the codes can be transmitted first, followed by the codes, pixel by pixel.

The operation is renewed for the following window and so on until the end of the image. Clearly, the classification algoritham used requires an initialisation of the classes R1 . . . R32, which can be obtained, for example, by a regular distribution in space.

Advantageously, previous calculation results can be used as the basis for initialising the following classification, in order to take advantage of the strong spatial correlation from one line to the next, or of the temporal correlation from one image to the next. More particularly, the first line of the image can be more effectively treated by using the barycentres obtained during the classification of the same line of the image preceding in time.

Analog television systems form frameworks which are clearly defined by their standards of sweeping (cadence, number of lines), colour coding (NTSC, SECAM, PAL) and broadcasting, which it is desirable to maintain at least at a certain level, so as not to have to introduce complicated apparatuses for the compatible interface. Numerical television is better adapted to the requirements of the users, by maintaining serial division into successive lines for analysis and, as regards colour, by treating in parallel three characteristic components Y, R−Y, B−Y, for each pixel, defined from the primary red (R) green (V) and blue (B) components by the following relationships:

$Y = 0.59V + 0.30R + 0.11B$ $R - Y = 0.70R - 0.59V - 0.11B$ $B - Y = 0.89B - 0.59V - 0.30R.$

The signal Y, or luminance signal, can be considered to be the panchromatic version of the image; the two other signals R−Y and B−Y are specific of chromaticite.

This distribution of the information enables the message to be broken up into discrete units by performing a periodic probing of these three signals at regular cadences (13.5 MHz for Y; 6.75 MHz for R−Y and B−Y) so as to number their values at 265 levels (8 bits) without substantial degradation of quality. This corresponds to 720 pixels of luminance Y for the active part of the scanning line.

Clearly, the probing of chromaticite is performed with a density half that of the luminance Y—i.e., 360 sweeps R−Y and 360 sweeps B−Y, but it nevertheless remains perfectly adequate for the required quality level.

It may be considered that this format leads to extending the chromaticite of a pixel i to the following pixel i+1 in the line or, if preferred, to assimilating the pixel of chromaticite to a rectangle covering two adjacent pixels of luminances.

The same assimilation can be carried out in the vertical direction, resulting in a probing of chromaticite four times less dense than that of the luminance Y, but still very adequate for natural images. In any case, of course, reproduction does not demand as high a definition for chrominance as for luminance.

DIFFERENCE OF PROCESSING BETWEEN LUMINANCE AND CHROMINANCE

To profit best by the redundance of the image, two conjoint complementary zones are defined by selecting for each of them the best adapted method of coping.

1. The first zone forms a trichromatic subassembly, each pixel of which comprises the three components Y, R−Y, B−Y obtained with a probing density four times lower than that of Y. The first zone describes a precise image of the spatial *low frequencies* of the three images R, V, B, of the trichromatic analysis.

The quantities transmitted $Y_M$, $(R-Y)_M$ and $(B-Y)_M$ are the components of the vector whose classification will be performed in accordance with the procedure set forth hereinbefore for this first zone.

For each window two messages will be transmitted:
the sequence of the codes of the successive pixels, such codes enabling the class in which each pixel has been included to be identified;
the dictionary giving the correspondence between the code of each class and the values of $Y_M$, $(R-Y)_M$ and $(B-Y)_M$ of the model, to enable the low frequency image to be reconstructed.

2. The second zone required for a reconstruction of the image with full resolution will be formed from *high frequencies* of the luminance signal Y, without any chromaticite information.

Figure 3:
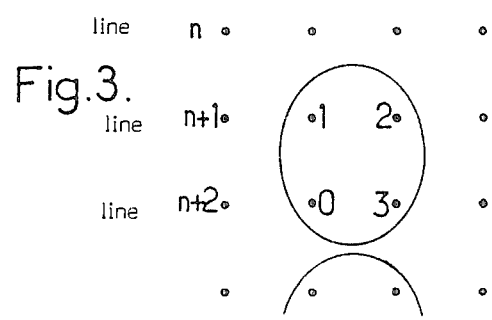
FIG. 3 is a diagram illustrating the combination of a number of elementary points in accordance with orthogonal probing.

A satisfactory approximation of the signal $Y_M$ is obtained by producing the mean of the luminances of a combination of a number of contiguous pixels of the initial probing Y. Advantageously, 4 pixels are combined in accordance with the type of orthogonal probing as shown in FIG. 3; the pixels 0 and 1 are situated on the lines n+2 and n+1 respectively on the same vertical; the pixels 3 and 2 are situated on the lines n+2 and n+1 immediately to the right of the pixel 0 and 1.

The pixels might be combined in accordance with some other type of probing, for instance, quincunx-line or quincunx-weft.

If we denote by $Y_0$, $Y_1$, $Y_2$, $Y_3$ the luminances of the pixels 0, 1, 2 and 3, the mean value $Y_M$ will be:

$$Y_M = \frac{Y_0 + Y_1 + Y_2 + Y_3}{4}$$

The other quantities $(R-Y)_M$ and $(B-Y)_M$ are obtained from the mean values of chrominance of the pixels of the combination produced with $$(R-Y)_M = \tfrac{1}{2}[(R-Y)_1 + (R-Y)_0]$$

$$(B-Y)_M = \tfrac{1}{2}[(B-Y)_1 + (B-Y)_0]$$

The fact is that probing for the characteristic components R−Y and B−Y is performed at a cadence (6.75 MHz) half that of the probing Y (13.5 MHz), and it is considered that the pixels 2 and 3 of the combination of four pixels show in FIG. 3 have the same chrominance characteristics as the immediately adjacent pixels 1 and 0 of the probing.

PRELIMINARY UNIT TRANSFORMATION ON THE LUMINANCE SIGNALS

With a view to reconstructing all the pixels on reception, a unit transformation is applied to the signals of luminance Y of each of the pixels of a combination produced as shown in FIG. 3, which enables the volume of information to be transmitted to be reduced, while on reception an expansion of information is performed to reconstitute each elementary point.

The linear transformation used is advantageously a Walsh-Hadamard transformation. It will be considered to be applied to the combination of four pixels 0, 1, 2 and 3 in FIG. 3 but it can equally well be applied to a combination of sixteen pixels distributed, for example, in a square matrix.

The mean luminance $Y_M$ is equal to half the first components $WH_0$ of such transformation of . . . :

$$WH_0 = \tfrac{1}{2}(Y_0 + Y_1 + Y_2 + Y_3) = Y_M.$$

The four values $Y_0$, $Y_1$, $Y_2$ and $Y_3$ are coded by applying the transformation in question to them, i.e., the description of Y is completed by the three complementary components representing the high frequencies:

$$WH_1 = \tfrac{1}{2}(Y_2 + Y_3 - Y_1 - Y_0)$$

$$WH_2 = \tfrac{1}{2}(Y_2 - Y_3 - Y_0 + Y_1)$$

$$WH_3 = \tfrac{1}{2}(Y_2 - Y_3 + Y_0 - Y_1)$$

It may be noted that the mean values of chrominance correspond to the first component of the Walsh-Hadamard transformed expression i.e., the low frequency term which is therefore used on its own.

The advantage of this type of coding resides in the decorrelation of the coefficients resulting therefrom, thus ensuring a reduction of the spatial redundance on the group of four pixels 0, 1, 2, 3. In this way the volume of information to be transmitted can be reduced by introducing a codification adapted to each of the coefficients $WH_1$, $WH_2$, $WH_3$, by means of an attribution of optimised bits for each one.

Experience shows that the histogram of the values of these coefficients in an image shows a rapid decrease of exponential nature as a function of the amplitude, so that it is advantageous to set up a law of quantification with non-linear steps enabling the codes to be allotted to the most probable values. Subsequent reconstruction shows errors, but the mean quadratic difference can be maintained within acceptable limits, if a law is selected which is well adapted to the sample of the values of the window to be considered.

The objective of a high compression rate results in special arrangements to obtain a satisfactory adaptation to the statistics of distribution of the values in each window.

One possibility is to define typical, but judiciously selected non-linear tables, possibly with a variable number of levels and bits, and then select from them the table which enables the best result to be obtained—i.e. the most faithful reconstruction of the window. In that case all the reconstruction tables must be available, and a special code associated with each window must be used to indicate the one whose law was selected in coding in order to quantify the coefficients of the groups of pixels of the window.

Another solution, which is a little more expensive in binary volume, but which allows a closer adaptation to the real distribution of the coefficient $WH_1$, $WH_2$, $WH_3$ of the window consists in carrying out for each of them a classification similar to that of the tricomatic low frequencies. This is merely a matter of regrouping into sizes of classes with one dimension, and not vectors with a number of dimensions, thus simplifying calculations, although the procedure remains the same:

initialisation of the classes,
regrouping by class of values of the windows,
calculation of the means of each class,
iteration.

For each group of pixels of the window, therefore, three codes must be transmitted corresponding to $WH_1$, $WH_2$, $WH_3$ and also a dictionary specific for each window and supplying the mean values of reconstruction of each class, to be used in accordance with the code.

A distribution of bits which has given satisfactory results consists in allotting 8 classes and therefore one code of 3 bits ($8 = 2^3$) to each of the coefficients $WH_1$ and $WH_2$. Only the two classes, requiring a code with one bit, are enough for the coefficient $WH_3$, whose dynamics are substantially weaker.

A total of $(2 \times 3) + 1 = 7$ bits are required per combination of 4 pixels, such 7 bits having to be complemented by the dictionary of the $(2 \times 8) = 16$ classes (about 64 bits) of $WH_1$ and $WH_2$ and of the mean value of the modulus of $WH_3$ since the only bit transmitted for $WH_3$ is a sign bit.

At this stage of the exemplary description, it may be noted that the combination of the codings of the tricromatic zone and the high frequency luminance zone can be differently parametered in accordance with the type of application, the acceptable numerical outputs, or the modes of construction, without exceeding the scope of the invention.

It may prove desirable, for example, with a view to preserving the quality of subsequent manipulations, to have available, after coding and decoding the full chromatic resolution of the image—i.e., that corresponding to a sweeping of all the components of 13.5 MHz. In that case all the pixels will have to be treated as forming part of the trichromatic space, without any complementary transformation of the luminance space.

The classification will relate to the values Y, R−Y, B−Y of each pixel (or R, V, B) supplying 720 codes per line of analysis, and a dictionary of the values representative of each class by window. It would therefore be advantageous to define the window in question as a single line of analysis, instead of a pair of two lines, as before, in order to avoid the storage of a scanning raster.

The fact is that due to analysis by interlaced scanning of the television image, for the 2 methods of processing, classification and transformation, of a window formed by 2 contiguous lines, values must be available relating to two successive rasters, to which the lines n+1 and n+2 of FIG. 3 belong respectively. An image store is therefore charged and read for each of the components Y, R−Y and B−Y of a raster charged and read in real time at the same time as the channel delivers the corresponding flux of the following raster. The result is a global delay of a raster—i.e. 20 m sec between the input and output of an image in the coding system. Various strategies can be envisaged in accordance with the transmitting channel output, the architecture of the coding and decoding means, and their level of complexity.

By way of example, a system can be conceived in which the image is refreshed at the raster rate (cadence) of the television signal (50 per second)—i.e., by continuously transmitting at the rate of input of the pixels the various components of low frequency trichromatic classification and high frequency WH (Walsh-Hadamard) transformation.

In these conditions, on reception all the signals are also permanently available which are required for reconstruction, without the need for considerable storage means. On the other hand, another result is a numerical output which is relatively high, because it is redundant in the time sphere.

Variant: If the fineness of chromatic resolution can be appreciably lower than that of luminance, it is also possible to envisage the application of a unit transformation of order greater than 2 to the zone of luminance high frequencies, by combining, for example, 16 luminance pixels in an assembly $4 \times 4$ whose mean value will be coded with the corresponding chromatic components by classification. Another method may consist in maintaining the 2nd order transformation and the classification of a combination of 4 pixels, but selected from the same interlaced analysis raster, thus also avoiding storage.

On the other hand, in another preferred concept the message can be divided between the two modes described, for example the classification components being supplied during one raster, the following raster serving for the transmission of the other subassembly of high frequency components. If arrangements are made to have two submessages of equivalent volume, the transmission output is divided by 2, but reconstruction implies the use during two rasters of each of the subassemblies which are to be temporarily stored. The refreshment of the image is in that case that of the rate of two rasters—i.e. 25 per second.

The window f given by way of example and formed by two contiguous lines on the image (one belonging to the even raster, the other to the odd raster) enables the segmentation already caused by the analytical scanning of the television standard to be respected as far as possible in both time and space, and forms a preferred version of the transmission system. In this way the data are processed continuously as they are available, in parallel, by two independent operators applied to the two zones, trichromatic low frequency and luminance high frequency. This allows the greatest flexibility in the organisation of the format of transmission and more particularly enables the transmission channel to be allotted readily to one submessage or the other or alternatively, as stated hereinbefore.

Moreover, when the output of the transmission channel is adequate the two messages can also be multiplexed to avoid stores on the reception side.

With the same objective, for a given frequency of probing and for each of the submessages, a group of data of clearly defined structure and fixed length can be defined which supplies, in the nature order of succession of pixels, the classification codes or the WH components of the line of analysis corresponding to the number of the group in the succession of data associated with a complete raster. This possibility ensures high operating security and has the advantage of requiring no regulation of output in relation to the contents of the image.

If the transmission capacity is adequate, it may also prove advantageous to respect for each group the rate of line frequency analysis of the television signal. The volume of the intermediate storage blocks is thus minimised and the interval of raster suppression is retained available for other messages, such as those already existing in the analog system.

We shall now consider the devices for putting the method according to the invention into effect.

The operations required for the coding and de-coding of an image can be carried out using different means in dependance on the constraints imposed by various parameters, amongst which the most important are the rate of supply of pixels by the upstream device, the acceptable volume of electronic components, the level of adaptability of the equipment to variations in parameters as a function of operating conditions.

For example, if a considerable coding time is accepted, processing can be envisaged which is entirely performed by a single microprogrammable operator or, on the contrary, if maximum speed is required, a combination of wired operators can be considered which are mounted in series-parallel, so as to introduce no waiting into the flow of data between each elementary operation. A whole range of mixed combinations can be envisaged between these two extreme possibilities.

Figure 2:
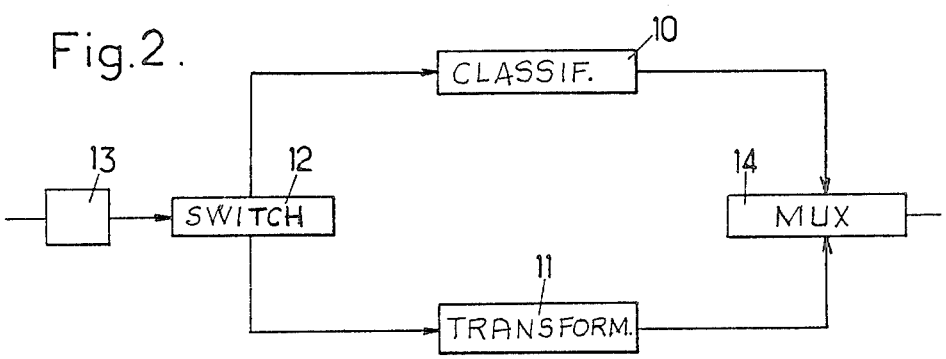
FIG. 2 is a synoptic diagram of a device for putting the method into effect.

As shown in FIG. 2, the different variants coming within the framework of the method can be constructed from two electronic subassemblies 10, 11, one 10 of which is for classification and the other 11 for transformation, operating in two parallel paths.

An acquisition and demultiplexing device 12 disposed upstream separates and switches, as a function of time in accordance with the defined coding law, the various data to the path suitable for their processing. The data are supplied by means 13 for determining the window and scanning the image; the means 13 can comprise, for example, a video camera combined with an analog/digital converter and storage means supplying words of eight bits corresponding to the characteristics Y, R−Y, B−Y. It may be supposed that the data arrive at the acquisition device 12 via a bus with 24 bits supplying, at the rate for each pixel, the characteristics, Y, R−Y and B−Y. These three characteristics are required for the classification processing by 10 of the trichromatic space, while only the first item of data Y comes into the processing or the high frequencies by 11.

If only one classification should be performed (without transformation), only the subassembly 10 would be used.

At the output of the subassemblies 10 and 11, a multiplexing member 14 for the coding products enables the transmission message to be constructed.

As regards the processing of trichromatic classification, and analysis of the various operations implied in the coding of a window shows two types of procedure A, B.

On the one hand operations of type A (unit transformation) are performed for a pixel or a combination (such as that shown in FIG. 3) of pixels.

On the other hand operations of type B (clustering) are applied to the window as a whole.

Moreover these two types of procedure must necessarily be carried out in succession since the results obtained in the first type A must be completely available before the second of B is started. Finally, since it is preferably an iterative device at the window, the first scanning must also have been completely finished before the second scanning can be started, which is characterized by a fresh initialisation of the components of the vectors identifying each class of the window.

At the means for performing these operations, a cascade of apparatus is provided which forms a contiguous functional chain, care being taken to limit the inoperative times between each, in order to reduce the processing time. Correlatively, if certain operators are liable to introduce a slowing down of the output, advantageously chains are created parallel with this level, to maintain a constant processing output.

Since the optimum use of the equipment must be ensured, permanent operation of all the operators must be attempted, without an inactive phase. This is possible, on condition that the flow of data relating to a window are mixed between operators of type A and operators of B in suitable numbers to take into account their relative processing speed. This organisation results in a management of the means such that the factional change no longer necessarily coincides with a particular chain of equipment. More particularly, an iteration can use operators which differ from those of the first scanning to the extent that the latter may have been allotted to the treatment of a new window.

FIGS. 4 and 5 give two examples of the optimum use of operators of type A and type B.

In the two cases the operators are so provided that each of them is capable of processing a window in a time corresponding to the video rate.

In FIG. 4, the coefficients used for initialising the window b of the image i are the results obtained on emergence from the processing of the preceding window (b−1) of the same image i. The operators A therefore operate for (i, b) during a first interval of time 0, $\tau$, the operators B during [$\tau$, 2$\tau$] then the operators A on (i, b+1) ... (2$\tau$, 3$\tau$), and so on. Each of the operators is therefore occupied 50% of the time for the image i, the complete treatment of the image being performed at half the real time rate. The remaining 50% of the time can be used for treating another image, i+1, for example. The only precaution consists in offsetting the treatment of i and i+1 so that the initialisation of the coefficients for the first window of each image can use the results of the first window of the preceding image. Two images are therefore simultaneously treated at half the real time rate, which is the equivalent of treating one image in real time. In this mode, therefore, a buffer store is required.

In FIG. 5 the coefficients used for initialising the window b of the image i+1 are the result obtained on emergence from the processing of the same window b on the image i.

The window i, b is treated successively by A and then by B and the results are stored until the arrival of the window i+1, b.

It should be noted that this second mode lends itself to parallel processing and is well adapted to the use of microprogrammable processes, since the only time constraint is due to the fact that the result of the stages A and B on (i, b) must be available before the arrival of (i+1, b). At the limit, therefore, there can be as many independent processing chains A+B as there are windows in an image, each treating one window during the time of one image. More generally, if there are q windows in an image, we can image q/k, independent chains of type A and q/k independent chains of type B, without k and k' being necessarily identical. (See FIG. 6).

Figure 7:
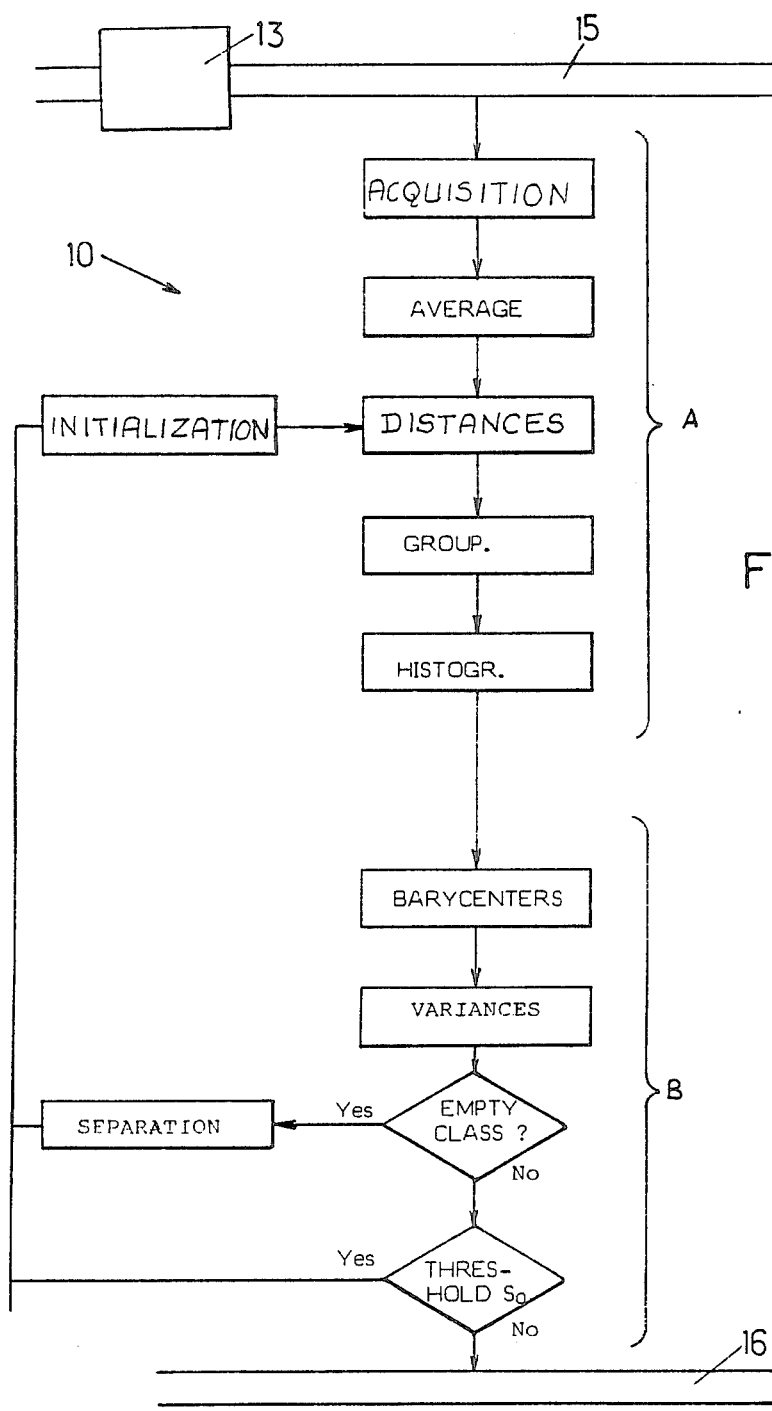
FIG. 7 is an organigram of the device for putting the method into effect.

FIG. 7 shows a synoptic operating diagram of the classification subassembly 10 in FIG. 2. Progression is from top to bottom on FIG. 7, between an input bus 15 and an output bus 16. After the acquisition of the data relating to a combination of pixels (as shown in FIG. 3, for example), the mean luminances and chrominances are calculated. Then a calculation is made between the distances between the end of the vector, having these mean values as components, and the ends of the vectors identifying the classes which have been initialised. Each point is included in the class corresponding to the shortest distance (regrouping). The points of each class are counted (histograms). Then the operation B is carried out which concerns the whole window.

The barycentres of each class are calculated (barycentres) and then the variances of each class (variances).

Then an empty class test is carried out. Each class in which no point has been included is detected.

If at least one such class exists, a "separation" is carried out, consisting in the creation of fresh classes by doubling the class having the highest variants.

This is obtained automatically be defining, from the barycentre of the class having the highest variants, two different symetrical initialisation values which are distant by at least one quantification step, upwards or downwards, in all directions. Two fresh values are thus obtained which necessarily define two independent classes during subsequent iteration.

The operation is renewed if there is still an empty class after the first doubling.

This ensures that for each window all the available classes are used, such precaution being a substantial source of improvement of the performances of the system.

The fresh components of the vectors identified in the classes are used for a fresh initialisation with a view to an interation.

If no class is empty a threshold test $S_o$ is carried out to decide whether or not there will be an iteration. For example, the threshold test can consist in totalising the variances of each class and comparing such total with a predetermined value $S_o$.

If the sum of the variances is higher than $S_o$ an iteration operation is ordered.

If the sum of the variances is less than or equal to $S_o$ classification is considered to be satisfactory, and the codes are transfered in the order of the pixels and the dictionary of classes is transferred by the output bus 16 to a system of utilisation, for example, a transmission or storage system.

In various materials the convergence of classification has been studied in relation to various parameters which come into the performances of the servomechanism formed by the algorithm described (loop gain, integration constant, residual error). It appears that starting from an arbitarary uniform initialisation, and without any iteration on each window, about ten successive windows must be processed, each window supplying the initialisation subassembly to the following window. Thus, operating conditions" characterised by a relatively stable mean quadratic error of reconstruction can be obtained.

Although this procedure can be envisaged when a continuous message of a large number of successive windows is processed, the first of which can stand appreciable errors, it seems out of the question in the case of repetitive images of the television, in which identical quality if required over the whole image.

On the one hand, therefore, as already pointed out, initialization is provided from the preceding line or image but also, for each window there is provided, an adaptivity phase consisting in calculating, after the first scanning, the barycentres of the points of each class of the window, to iterate the process and further refine classification. It has been found that the quadratic error of reconstruction diminishes after the first iteration and becomes stabilised after 2 or 3 iterations, in dependance on the variability of the image.

These iteration operations are counterbalanced by an increase by a factor of 2, 3 or 4 in the processing time, since every time the whole window must be processed before a fresh iteration can be started. An acceptable compromise would be looked for between precision and the time required to obtain it.

The transmission systems used from the bus 16 must respect a format enabling the codes of each particular combination of pixels at the window and the corresponding dictionary to be retrieved from the flow of data. The simplest solution consists in supplying on the one hand the succession of codes in the order of succession of the pixels in the window—i.e., along the TV analysis line—and on the other hand the values of the components of each class, for example, in the order of increasing codes.

In this way groups of fixed length are obtained which can readily be recognised and processed in the decoding operator.

Another advantage of this organisation of the message resides in the total independence of the windows amongst one another, more particularly as regards the codes and dictionary. Any error therefore affects only one pixel if it relates to the codes, and affects only one window if it relates to the dictionary. Satisfactory protection against the propogation of errors can therefore be predicted. Moreover, a simple protection procedure for the dictionary, without the correction of errors, is adequate if, in case of error detection, the use of the dictionary of the preceding window is accepted, which has considerable similarities, due to the method of initialisation and the spatial correlation between windows.

FIGS. 8 to 12 show examples of circuits which conform the elementary operators shown in FIG. 7.

Figure 8:
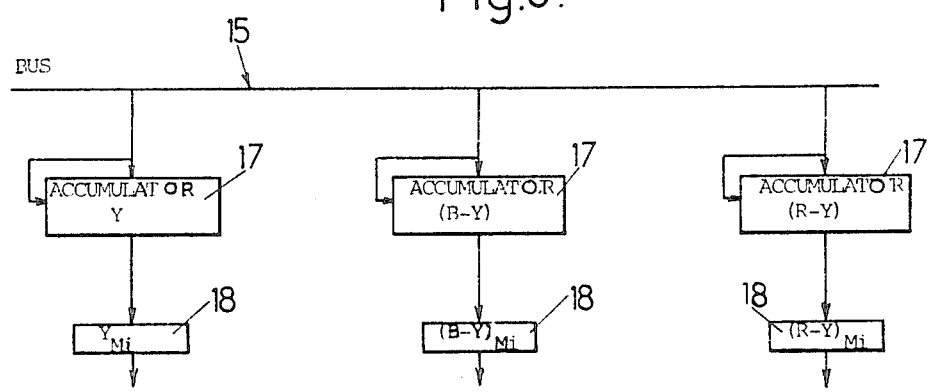
FIGS. 8 to 12 are more detailed synoptic diagrams of blocks in the diagram of FIG. 7.

FIG. 8 shows an operator for performing the acquisition of the data and the calculation of the means. The input data are supposed to be supplied by a sampling of 8 bits, the input bus 15 or data bus comprising 9 wires (8 wires for the data bits and 1 wire for 1 validation bit) per channel. In the case of three channels, the bus 15 therefore comprises 27 wires.

The wires of the bus supply an accumulator 17, which is charged on demand when the values relating to the current pixel appear, such values coming from an analogue/digital convertor or previously charged raster memory. There are as many accumulators 17 as channels; in the example in question, colour television with three channels, there are therefore 3 accumulators 17 corresponding to the components Y, B−Y and R−Y. Each accumulator 17 totalises the radiometries which concern it, for 4 pixels of types 0, 1, 2 and 3, as shown in FIG. 3.

In the case illustrated in FIG. 8, the accumular 17 situated furthest to the left and intended for the component Y has 10 bits at the output, while the two other accumulators associated with the two other components B−Y and R−Y have 9 bits at the output.

A shift of bits enables the mean values of the current pixel i to be supplied to registers 18 in which the values $Y_{Mi}$, $(B-Y)_{Mi}$, $(R-Y)_{Mi}$, are inscribed.

Figure 9:
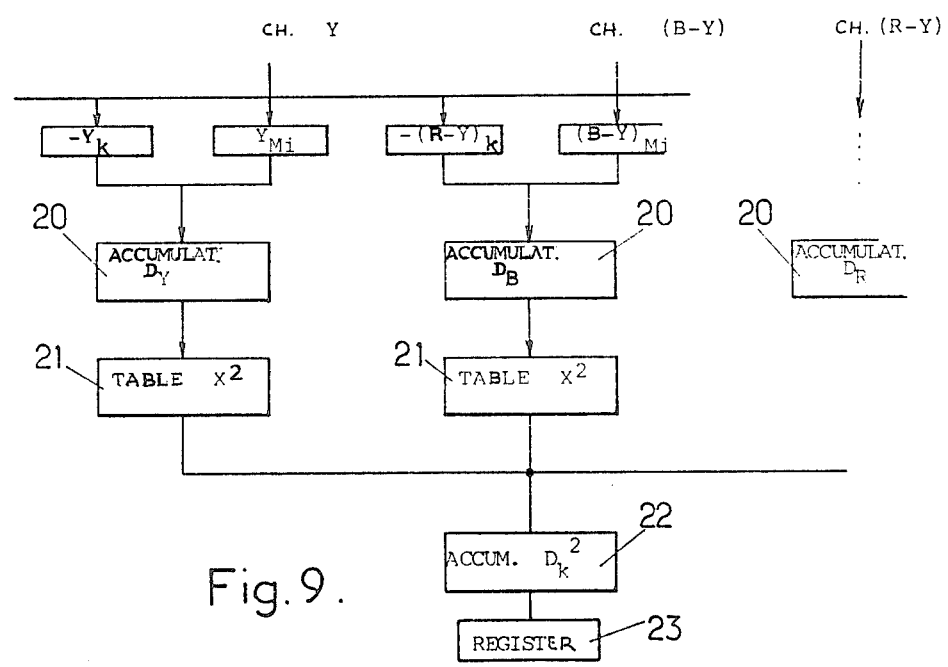

FIG. 9 shows a "distances" operator adapted to calculate for each pixel i the values:

$$D_Y^2 = (Y_i - Y_k)^2$$

$$D_R^2 = [(R-Y)_i - (R-Y)_k]^2$$

$$D_B^2 = [(B-Y)_i - (B-Y)_k]$$

and obtain their total, which is equal to the square of the distance between the end of the vector representing the pixel i and the barycentre of the class k.

The values of the quantities $Y_k$, $(R-Y)_k$, $(B-Y)_k$ are supplied from the initialisation store 19 (FIG. 7) in a complemented form with 3 separate accumulators 20 associated with each of the 3 channels, the accumulators also receiving the values $Y_{Mi}$, $(R-Y)_{Mi}$ $(B-Y)_{Mi}$. A "square" conversion table, more particularly formed by a PROM store, is then read at the address supplied by the difference given at the output of each accumulator 20; the conversion table 21 supplies at its output the value of the corresponding square—i.e., the respective values $D_Y^2$, $D_R^2$, $D_B^2$. Then, in a last accumulator 22 the sum of the squares is obtained relating to the 3 channels: this sum E is entered into a registered 23.

In dependance on the rate of supply of the data and the rapidity of the circuits used, these calculations can be performed for each of the 32 classes in series or in parallel, or any envisagable series-parallel combination, the objective being to make available for the corresponding 32 following operator registers, such as the register 23, which store the distances relating to the 32 initialised classes.

Figure 10:
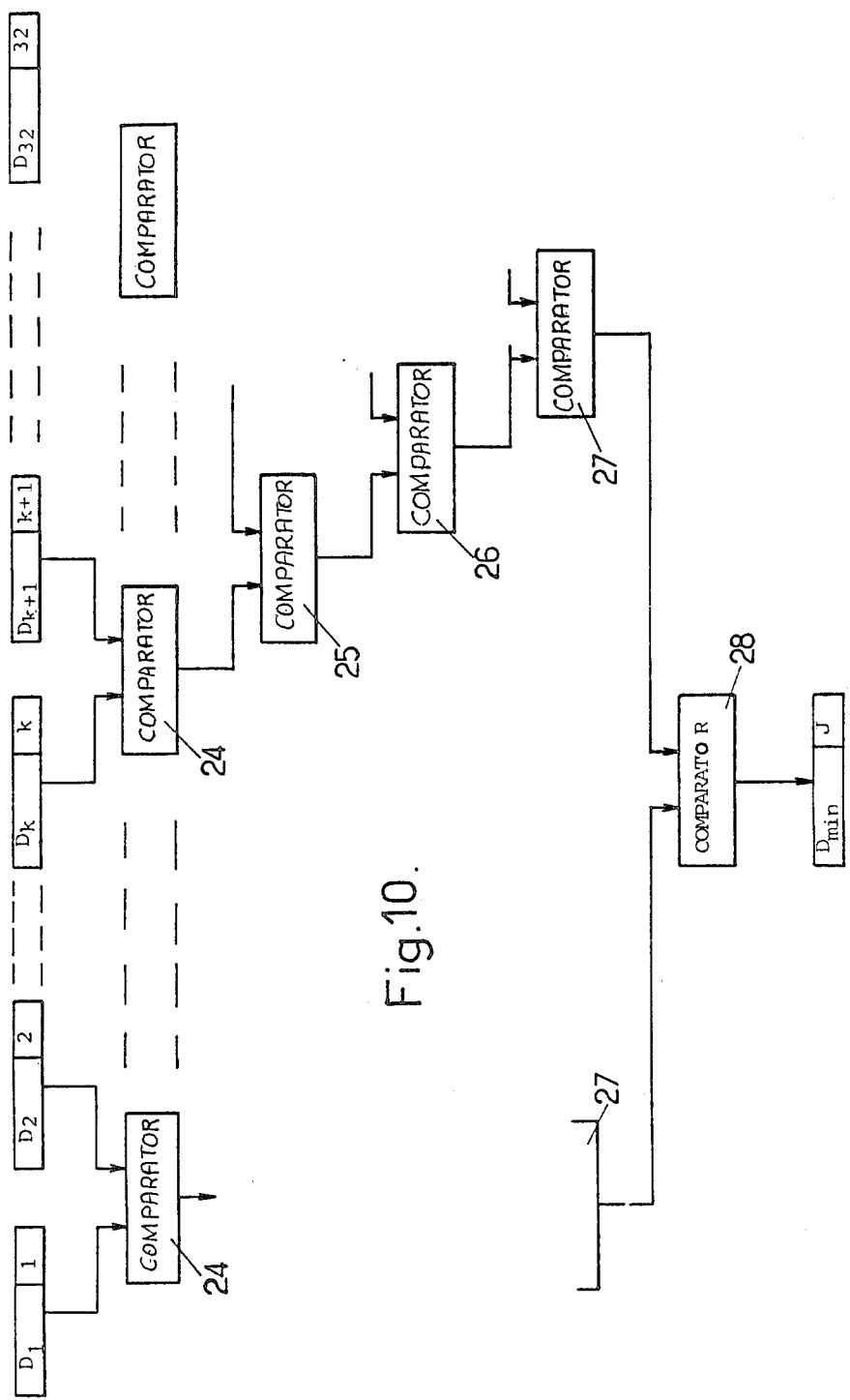

FIG. 10 is a diagram of an operator for performing the regrouping of the points. The operator is adapted to determine the lowest of the 32 distances calculated by the operator shown in FIG. 9; the operator must also designate such distance by the code of the corresponding class.

Advantageously, 5 extra bits of low weight, characteristic of the class of the distance are associated with the value of each distance register (such as register 23 FIG. 9); FIG. 10 shows diagrammatically by a large rectangle the value of the distances D1, D2 . . . , the class code 1, 2 . . . being shown by a small rectangle situated immediately to the right of the large rectangles. A first stage of comparators 24 is provided for making the comparison of all the distances 2×2, thus giving 16 results at the outputs of the comparators 24, corresponding to the lowest values of the two compared terms. A second stage of comparators 25 will enable the result of the comparison to be reduced to 8 distances, and step by step, with the third comparator stage 26 and the fourth comparator stage 27, we finish up with a fifth stage formed by only one comparator 28 which delivers at its output the shortest of the 32 distances and the corresponding class code J.

The same results could be obtained by other assemblies enabling either the processing time or the amount of equipment necessary to be reduced.

Figure 11:
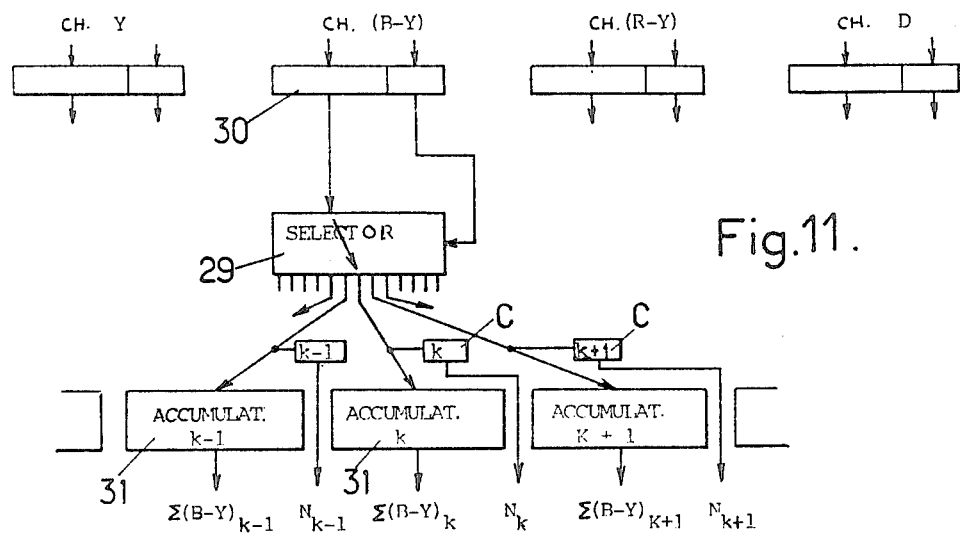

FIG. 11 is a diagram of a circuit for producing histograms. The stage which still forms part of the operations of type A, since it is actuated at each new pixel, is the preparation for operations of type B. For each channel (in practice in 3 parallel operators) it enables the radiometries of the pixels of each class to be totalised, and the squares of the minimum corresponding distances to be totalised in a fourth parallel operator; there is also the incrementation of one pixel counter per class.

Each operator comprises a selector 29 with one input and 32 outputs, which switches the contents of the register 30 charged with the radiometry data or distance of the current pixel to one of the accumulators 31 of a bank of thirty-two accumulators, such accumulator being selected by the code word associated with the pixels. Simultaneously one of the thirty-two pixel counters C is incrementated by one unit. At the end of a window each of the 4 class accumulators (3 accumulators for the characteristics (Y, R−Y and B−Y, and one accumulator for the distance), and each corresponding counter is interrogated to charge 5 "sum" registers effectively associated with the radiometries Y, R−Y, B−Y the distances and the number of pixels in the class.

Figure 12:
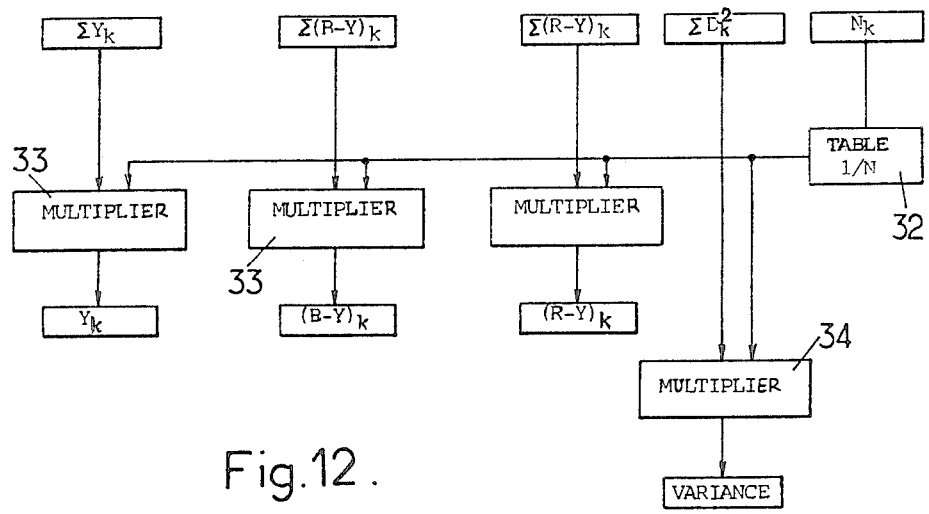

FIG. 12 is a diagram of an operator for calculating the barycentres and variances. The object is to perform a systematic calculation at the end of the window of the coordinates of the new barycentre of each class from the radiometries of the pixels making it up. In dependence on the time available, various solutions might be envisaged, ranging from a single operator successively processing all the classes and n operators working in parallel for 32/n classes with n=2, 4, 8, 16 or 32.

Calculation of the coordinates of the barycentre consists in dividing the totalisations of the radiometries by the number of pixels in the class.

For this purpose a table 32 for convertion of inverses is provided, the table being addressed by means of the number of pixels in the class and supplying at its output the inverse of the number which is applied to a multiplier 33 receiving at its other input the contents of one of the radiometry registers. The results supplied at the output of the multiplier 33 is the coordinate of the corresponding barycentre.

The calculation of the varients of each class is performed similarly by an operator of structure identical to the one just described, from the "sum of the squares of the distances" register, whose contents are divided by the number of pixels in the class. This results is obtained by means of a multiplier 34 one of whose inputs receives the sum of the squares of the distances, the other input receiving the inverse of the number of pixels.

If an empty class is detected, for example, by the identity of the bits of the number with zero, a comparison will also be made of the variants of all the classes to find that of maximum variance, which will be doubled. This search is carried out in the same manner as the shortest distance was found in regrouping. The operator will have a structure similar to that shown in FIG.

10, of stage comparators; however, in the case of a search for the maximum variance, the highest result will be selected instead of the lowest result in the case of the regrouping described with reference to FIG. 10. The class code corresponding to the highest variance is used to select the values of the coordinates of the barycentre, which are modified by addition and subtraction of a step or more to generate two separate barycentres.

The initialisation operation consists in transferring the values of the barycentre radiometries $Y_k$, $(R-Y)_k$ $(B-Y)_k$ to an initialisation store 19 (FIG. 7) formed by three banks of 32 cells of 8 bits which will serve for the "calculation of distances" operator as soon as a new classification (or iteration) is necessary.

However it should be noted that the initialisation of the first window of a new image (top part) which originate from another initialisation store identical with the preceding one. It will be enough for it to have been charged during the classification of the preceding image with the results of the first window of such image: the time correlation between images will generally enable a satisfactory result to be obtained.

Of course, this procedure can also be applied to all the blocks of the image if an initialisation store of adequate capacity is available to store all the dictionaries obtained during the classification of the preceding image.

Figure 13:
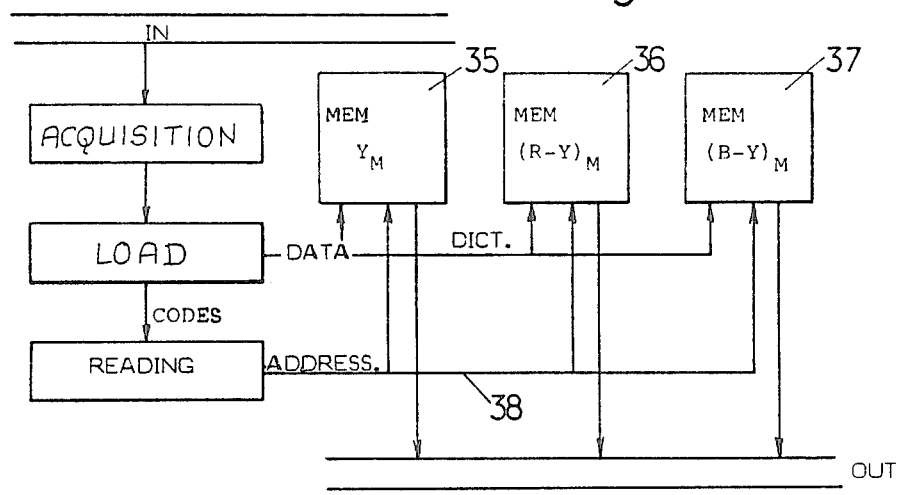
FIG. 13 is a synoptic diagram of the means used for decoding the data supplied after classification.

FIG. 13 shows diagrammatically means which ensure on reception the decoding of the information coming from the classification operation A and B. The decoding means can very simply be provided from three memories 35, 36, 37 charged respectively, with progressively increasing addresses, with the components $Y_M$ $(R-Y)_M$ and $(B-Y)_M$ of each class supplied by the dictionary supposed to be transmitted in accordance with the increasing order of the classes. Each pixel code received is applied to the address bus 38 and causes the reading of the values of the corresponding components for each of the memories 35, 36, 37. In this way the radiometries are obtained for each group of pixels which will be used to constitute each pixel of the group, after combination with the result of the decoding of the high frequency component of Y.

Figure 14:
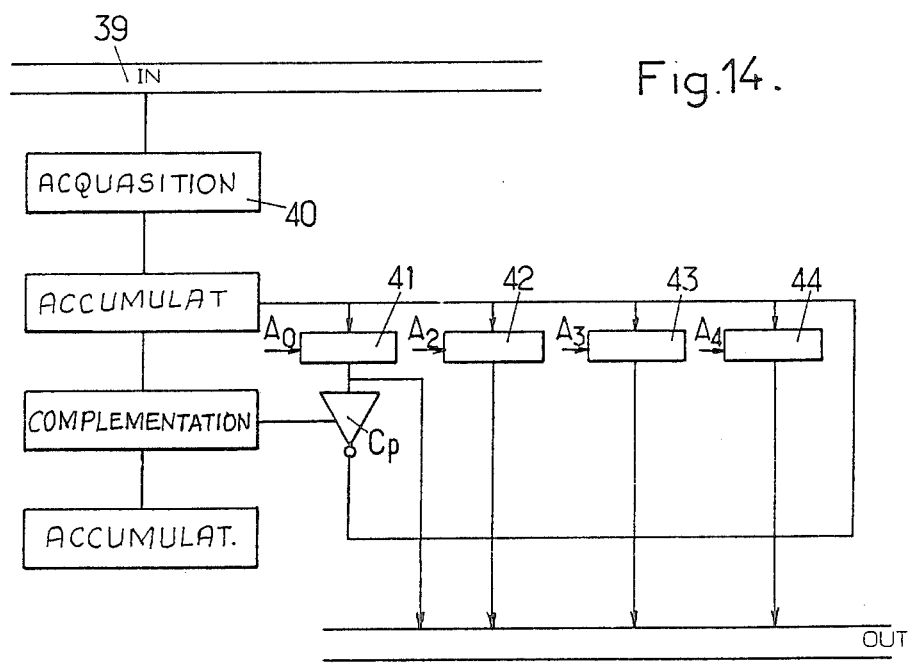
FIG. 14 is a synoptic diagram of an operator for linear transformation.

The coding of 4 luminance samples by Walsh-Hadamard transformation can be affected by a very simple operator shown in FIG. 14 and formed by accumulators and a complementor.

The quantities $WH_1$, $WH_2$ and $WH_3$ already indicated are to be calculated:

$$WH_1 = \tfrac{1}{2}(Y_2+Y_3-Y_0-Y_1)$$

$$WH_2 = \tfrac{1}{2}(Y_2-Y_3-Y_0+Y_1)$$

$$WH_3 = \tfrac{1}{2}(Y_2-Y_3+Y_0-Y_1).$$

These quantities can be expressed from the quantity $Y_M = WH_0 = \tfrac{1}{2}(Y_0+Y_1+Y_2+Y_3)$ by $$WH_1 = Y_2+Y_3-WH_0$$

$$WH_2 = Y_2+Y_1-WH_0$$

$$WH_3 = Y_2+Y_0-WH_0$$

The input bus 39 successively delivery the radiometry values Y at a regular rate, the calculations can be carried out using the operator shown diagrammatically in FIG. 14.

From the data bus 39, a locking register 40 is charged successively with the 8 bit values of luminance $Y_0$, $Y_1$, $Y_2$, $Y_3$ of the 4 pixels of the group.

These values are transferred to accumulators 41, 42, 43, 44, in parallel but selectively, as a result of actuation orders A1, A2, A3, A4. The order A1 allows the accumulation of the 4 radiometries in the accumulator 41, while the accumulators 42, 43 and 44 are actuated only for $Y_2$ and $Y_3$, $Y_2$ and $Y_1$ and $Y_2$ and $Y_0$ respectively. In a final phase the results of the accumulator 41 is transferred via the completor $C_p$ to the inputs of the 3 other accumulators to perform the subtractions of $WH_0$. Then the required coefficients are available at the outputs of the accumulators and are then applied to a classification device similar to that already described for low frequency trichromatic components. Finally 3 codes of classes $WH_1$, $WH_2$ and $WH_3$ are obtained and a dictionary relating to the mean values of each code of a processing window.

On reception, two operations are required to find the values of the radiometries. In the first place, the declassification operation must be performed—i.e. for each group of pixels those values of the WH coefficients which are allotted to them by the three codes received must be discovered. This is done by an operator identical to that shown in FIG. 13, the three memories in this case being allotted to $WH_1$, $WH_2$ and $WH_3$ charged from the dictionary, but with the difference that each code, being specific, now addresses only one memory amongst the three to perform the reading of the corresponding coefficients.

Then these coefficients must be combined with $Y_M$ obtained during the decoding of the trichromatic space which plays the role of $WH_0$ in accordance with the familiar combinations of the Walsh-Hadamard transformation:

$$Y_0 = \tfrac{1}{2}(WH_0 - WH_1 - WH_2 + WH_3)$$

$$Y_1 = \tfrac{1}{2}(WH_0 - WH_1 + WH_2 + WH_3)$$

$$Y_2 = \tfrac{1}{2}(WH_0 + WH_1 + WH_2 + WH_3)$$

$$Y_3 = \tfrac{1}{2}(WH_0 + WH_1 - WH_2 - WH_3)$$

As before, it will be noted that these quantities are obtained from $Y_2$:

$$Y_0 = WH_0 + WH_3 - Y_2$$

$$Y_1 = WH_0 + WH_2 - Y_2$$

$$Y_3 = WH_0 + WH_1 - Y_2$$

This enables an operator to be used for this calculation which is identical to that shown in FIG. 14 and operates in the same manner, with the sole difference that $Y_2$ is also transferred to the output bus to define the radiometry of the 4th pixel.

In this way the initial message of each window has been reconstituted by the components of the combination of pixels $Y_0$, $Y_1$, $Y_2$ $Y_3$, $(R-Y)_M$ and $(B-Y)_M$.

The embodiment described related to colour television: however the invention can also be applied to black and white television by defining, as indicated hereinbefore, independent channels from a spatial arrangement of the pixels instead of a spectral selection.

The invention can be applied to many other fields, for example, for the processing of colour images in the aerospace field (a multispectral image whose number of channels can reach 11), photography, printing, telecopying. The invention does not relate only to the transmission of images, but also to the storage of numerically coded images, more particularly their recording on video disks, casettes or the like.

The unit transformation used for coding the pixels of a combination, of the kind shown in FIG. 3, will have an order suitable for the number of pixels in the combination and can be selected from amongst all those described in the Literature (Walsh-Hadamard, Slant, cosine, Fourier, Haar, Karhunen-Loeve . . . ) in accordance with the criteria considered most important (facility of calculation, rapidity, suitability for compression . . . ).

The Walsh-Hadamard transformation is generally the most advantageous, along with the cosine transformation, which has however the disadvantage of being more complicated to put into effect.

What is claimed is:

1. A method for digitally coding an image consisting of pixels regularly distributed in the image and each having N particular values of previously measured radiometric properties $C_i$ in N spectral channels, N being an integer, comprising the steps of:
   (a) dividing the image into windows having a uniform predetermined geometrical shape and having a same predetermined number of pixels;
   (b) grouping the pixels in each of said windows into sets each in one of a plurality of classes ($R_1, R_2, \ldots$)based on a criterion of proximity in N-dimensional space, between ends of vectors which each represent the N particular values of a respective pixel and ends of vectors which each represent respective N predetermined typical values of a respective class;
   (c) re-defining each of the predetermined typical values of each of said classes from the respective particular values of the pixels of the respective set;
   (d) saving said redefined typical values for each window for reconstruction of said image; and
   (e) defining each pixel in each of said windows by a code identifying the class ($R_1, R_2, \ldots$) to which it belongs;
   further comprising the additional step of:
   (f) processing high spectral frequencies of the image in each of said windows by a unit transformation having a plurality of coefficients, one of said coefficients representing a mean value corresponding to a lower spatial frequency of the image and being associated with said redefined typical values.

2. A method according to claim 1, characterized in that the unit transformation is a Walsh-Hadamard transformation or a cosine transformation.

3. A method according to claim 1, characterized in that it comprises an initialisation step in which the predetermined typical values of the classes in each window are derived from the results of calculations carried out on an immediately preceding window.

4. A method according to claim 1, characterized in that it comprises an initialisation step in which the predetermined typical values of the classes of each window are derived from the results of preceding calculations relating to a window of an image preceding in time.

5. A method according to claim 1, characterized in that the number of classes for a window is fixed.

6. A method according to claim 1, characterized in that non-linear metrics are used for grouping the pixels.

7. A method according to claim 1, wherein after step (c) a fresh grouping of the pixels is performed into the classes having the re-defined predetermined typical values.

8. A device for digitally coding an image consisting of pixels regularly distributed in the image and each having N particular values of N predetermined properties in N different spectral channels, comprising:
   first means for producing a window of predetermined shape and for scanning the whole image with said window;
   second means for acquiring the values relating to each pixel in said window;
   an electronic classification subassembly comprising calculating means for generating a vector (the generated vector) which represents the N particular values of a respective pixel and calculating the distances from the end of said vector and ends of vectors (the representative vectors) which each represent N predetermined typical values of a respective class, the generated vector being comprised of components and the representative vectors being comprised of components;
   comparator means enabling each said pixel to be included in the class corresponding to a shortest distance calculated;
   third means for re-calculating the components of each of said representative vectors identifying a class from the pixels included therein, the output of the device being connected to means for transmitting or storing the output data;
   and an electronic transformation subassembly for carrying out a unit transformation on each of identical combinations of different pixels in the window, said unit transformation having a plurality of coefficients, one of said coefficients representing a mean value corresponding to a lower spatial frequency and being associated with said properties in different ones of said spectral channels,
   the classification and transformation subassemblies being located in two parallel paths.

9. A device according to claim 8, characterized in that the means for calculating the distances between the end of the generated vector and the ends of the representative vectors identifying each class comprise, for each channel, an accumulator means (20) supplying at its output differences between the N particular values of the generated vector and the respective values of one of the representative vectors; a "square" conversion table means (21) adapted to supply the squares of each of the differences; and another accumulator means (22) to totalise the squares.

10. A device according to claim 8 characterized in that the means for re-calculating the components comprises a selector (29) which switches the contents of a register containing data to one of the accumulators (31) of a bank of accumulators, and a counter (C) for counting the number of pixels included in a class.

11. A device according to claim 8 and further including means for decoding characterized in that said device comprises a dictionary containing the the recalculated components ($Y_m$, $(R-Y)_m$, $(B-Y)_m$) of the representative vectors; a decoding operator comprising memories (35, 36, 37) which respectively contain, at progressively increasing addresses, the recalculated components supplied by the dictionary, and an address bus (38) for said memories, said address bus receiving a code representing each pixel.

12. A device according to claim 8 characterized in that it comprises, for coding of a combination of luminance samples by said unit transformation, an operator formed by accumulators (41, 42, 43, 44) and a complementor ($C_p$).

13. A method for digitally coding and reconstructing a color television image consisting of pixels each having a luminance value (Y) and two chrominance values (R−Y) and (B−Y), comprising a preliminary step of distributing the pixels into combinations each of a same number of pixels and combining the luminance values and chrominance values of all pixels in each combination for obtaining a plurality of coefficients, one of which represents a mean luminance value $(Y)_M$ of the luminance values in said combination and others of which represent mean chrominance values $(R-Y)_M$ and $(B-Y)_M$ in the combination, and
   (a) dividing the image into windows having a uniform predetermined geometrical shape and having a same predetermined number of pixels and combinations;
   (b) distributing the combinations of pixels in each of said windows into sets each in one of a plurality of classes ($R_1, R_2, \ldots$) based on a criterion of proximity in 3-dimensional space between ends of vectors which each represent the three mean values of a respective combination and ends of representative vectors which each represent respective 3 predetermined typical values of a respective class,
   (c) redefining each of the predetermined typical values of each of said classes from the three mean values of the combinations of pixels of the respective set;
   (d) saving said redefined typical values for each window for reconstruction of said image; and
   (e) defining each combination of pixels in each of said windows by a code identifying the class ($R_1, R_2, \ldots$) to which it belongs,
further comprising the additional step of:
   (f) processing high spectral frequencies of the image in each of said windows by a unit transformation applied to each of said combinations and having a plurality of coefficients, one of said coefficients representing said mean luminance value corresponding to a lower spatial frequency of the luminance in the image and being associated with said redefined typical values while the other of said coefficients represent high frequencies of said luminance.

14. A method according to claim 13 characterized in that each window (f) is formed by at least one line of pixels (p) of the image.

15. A method according to claim 13, further comprising a step of detecting the presence of empty classes in which no combination has been grouped and, if at least one such empty class exists, performing a separation comprised of a creation of fresh classes by doubling of that one of the previously existing classes having a highest variance.

16. A process according to claim 13, wherein said additional step comprises a Walsh-Hadamard transformation of the luminance values and chrominance values of said combinations of pixels each consisting of $2^n$ pixels (n being an integer at least equal to two) and wherein during step (b) each of said vectors has components consisting of:
   all components of the Walsh-Hadamard transformation applied to the luminance values; and
   the mean value representative first component of the Walsh-Hadamard transformation of the chrominance values.

17. A method according to claim 13, characterized in that the number of classes for a window is fixed.

18. A method according to claim 13, further comprising a step of detecting the presence of empty classes in which no combination has been grouped and, if at least one such empty class exists, performing a separation comprising a creation of fresh classes by doubling of that of the previously existing classes having a highest variance.

19. A method according to claim 13 characterized in that non-linear metrics are used for the distribution of said combination of pixels.

* * * * *